United States Patent
Bolder et al.

(10) Patent No.: US 8,220,742 B2
(45) Date of Patent: Jul. 17, 2012

(54) ASSEMBLY AND METHOD FOR STOWING AWAY AND REMOVING A SURVIVAL KIT IN A PASSENGER CABIN OF AN AIRCRAFT

(75) Inventors: Paul Bolder, Hamburg (DE); Reinhard Becker, Hamburg (DE); Evgenij Habermehl, Hamburg (DE)

(73) Assignee: Airbus Operations GmbH (DE)

( * ) Notice: Subject to any disclaimer, the term of this patent is extended or adjusted under 35 U.S.C. 154(b) by 661 days.

(21) Appl. No.: 12/388,754

(22) Filed: Feb. 19, 2009

(65) Prior Publication Data

US 2009/0206200 A1 Aug. 20, 2009

Related U.S. Application Data

(60) Provisional application No. 61/066,335, filed on Feb. 20, 2008.

(30) Foreign Application Priority Data

Feb. 20, 2008 (DE) .......................... 10 2008 009 938

(51) Int. Cl.
*B64D 13/00* (2006.01)
(52) U.S. Cl. .......... 244/118.6; 114/367; 441/35; 441/42
(58) Field of Classification Search ............... 244/118.6, 244/122 R, 149; 441/35, 40, 42; 114/367
See application file for complete search history.

(56) References Cited

U.S. PATENT DOCUMENTS

| 4,289,286 | A | | 9/1981 | Spinosa et al. | |
|---|---|---|---|---|---|
| 4,355,987 | A | * | 10/1982 | Miller | 441/41 |
| 6,572,054 | B1 | | 6/2003 | Smallhorn | |
| 6,641,445 | B1 | * | 11/2003 | Jurlina et al. | 441/80 |
| 2003/0106962 | A1 | | 6/2003 | Smallhorn | |
| 2004/0195446 | A1 | | 10/2004 | Smallhorn | |

FOREIGN PATENT DOCUMENTS

| DE | 10244189 | 6/2003 |
|---|---|---|
| DE | 102004012249 | 10/2004 |
| DE | 102006008663 | 1/2007 |

OTHER PUBLICATIONS http://en.wikipedia.org/w/index.php?title=Box&oldid=102669898, Box, Jan. 23, 2007.*

* cited by examiner

*Primary Examiner* — Timothy D Collins
*Assistant Examiner* — Jamie S Stehle
(74) *Attorney, Agent, or Firm* — Lerner, David, Littenberg, Krumholz & Mentlik, LLP

(57) ABSTRACT

An assembly for stowing away and removing a survival kit in a passenger cabin of an aircraft, includes a first stowage compartment configured to be put in place in a floor of the passenger cabin. The first stowage compartment is equipped for completely accommodating the survival kit and for leading out a hook that is connected to the survival kit by way of a strap. The hook is used for hooking the survival kit to an attachment device of a rescue device with the first stowage compartment remaining closed.

11 Claims, 6 Drawing Sheets

ASSEMBLY AND METHOD FOR STOWING AWAY AND REMOVING A SURVIVAL KIT IN A PASSENGER CABIN OF AN AIRCRAFT

CROSS-REFERENCE TO RELATED APPLICATIONS

This application claims the benefit of the filing date of U.S. Provisional Patent Application No. 61/066,335, filed Feb. 20, 2008, the disclosure of which is hereby incorporated herein by reference.

The invention relates to an assembly for stowing away a survival kit in a passenger cabin of an aircraft.

BACKGROUND OF THE INVENTION

Usually, survival kits are carried along in the passenger cabin of an aircraft whenever an aircraft flies over regions in which in the case of an emergency landing either on land or on water, or in the case of a crash, search and rescue will be particularly difficult and/or the flight route is 50 nautical miles away from a coastline. The standard model of a survival kit contains, for example, first aid equipment, nutrition that is high in calories, water etc. and weighs up to approximately 10 kg. In the case of the aircraft making an emergency landing on water such a survival kit is removed from a stowage compartment, is latched to a slide raft by means of a hook, and when the slide raft is detached from the aircraft's fuselage is carried along in the slide raft.

Generally speaking, survival kits are stored in hatracks or other stowage compartments. In an emergency said survival kits have to be removed from these stowage locations and have to be taken to a slide raft. Due to the absence of installation space in the conventional slide raft compartments at the exit, the survival kits cannot be accommodated together with the folded slide raft. For this reason, depending on the number of slide rafts, in each case two survival kits are accommodated in suitable stowage compartments near the exits in the cabin.

Conventional stowing away of survival kits is associated with a disadvantage in that the survival kits are not located directly at the exit, but instead must first be removed from a corresponding stowage compartment by a member of the cabin crew, and must be transported to the exit, either while the passengers are evacuated or thereafter. Furthermore, if several survival kits are stowed away in hatracks or other stowage compartments, stowage space, which is anyway severely limited, is lost. In particular if there are a lot of passengers on board, a large number of relatively large survival kits have to be carried on board, which survival kits prevent many passengers from accessing baggage space for their cabin baggage.

SUMMARY OF THE INVENTION

It may thus be the object of the invention to propose a concept that is as optimised as possible for the stowing away of survival kits, which concept does not use stowage space for cabin baggage, wherein the survival kits are, however, arranged as near as possible to the respective exits, and wherein wherever possible manual transport of survival kits is no longer necessary.

This object is met by an assembly for stowing away a survival kit in a passenger cabin of an aircraft according to the characteristics of the independent claim 1. Advantageous improvements are stated in the subclaims.

In the assembly according to the invention the survival kit is accommodated in a first stowage compartment that may be put in place in a floor surface of the passenger cabin of the aircraft. From the first stowage compartment, in the closed state, a hook that is connected to the survival kit by way of a strap may be led out, which hook in a preferred embodiment may be accommodated in a second stowage compartment that is adjacent to the first stowage compartment, wherein the hook is used for hooking the survival kit to a slide raft. Both the first and the second stowage compartments preferably comprise a closure flap. The assembly according to the invention provides a particular advantage in that no stowage space in hatracks or in stowage compartments is taken up by survival kits. The assembly according to the invention may therefore be arranged as closely as possible to the emergency exits that provide the slides/rafts. In a smooth flight condition, for example before an emergency landing on water, the hook for hooking the survival kit to a slide raft, which hook is accommodated in the second stowage compartment, may be removed and attached to the still stowed-away slide raft. This means that the survival kit that is still stowed away may already be attached to the slide raft, without the need for prior repositioning or gathering of the survival kits by members of the cabin crew. Since, furthermore, the hook and part of the strap affixed to the hook may be removed from a separate, second stowage compartment, separately from the survival kit, there is no need to open the actual stowage compartment comprising the survival kit. Consequently, during evacuation of the passengers into the corresponding slide raft, the space is not blocked by the survival kit, and the survival kit is also not damaged during this procedure. After the evacuation of the passengers through the emergency exit into the slide raft, the survival kit is advantageously pulled from the slide raft itself, by way of the strap, from the first stowage compartment and is placed into the floating raft.

As a result of the assembly according to the invention, accordingly an optimised stowage concept for stowing away a survival kit in a passenger cabin of an aircraft is proposed, with which concept there is no taking up of valuable stowage space for cabin baggage of passengers, nor is the evacuation of passengers during an emergency landing, including an emergency landing on water, impeded. At the same time safe storage of the survival kit is provided. This is not possible with conventional assemblies for stowing away survival kits in passenger cabins of aircraft.

Furthermore, the object of the invention may be met by a method, the use, and an aircraft, according to the further independent claims.

BRIEF DESCRIPTION OF THE DRAWINGS

Below, the invention is explained in more detail with reference to the figures.

Similar components in the figures have the same reference characters. The following are shown.

DETAILED DESCRIPTION

Figure 1:
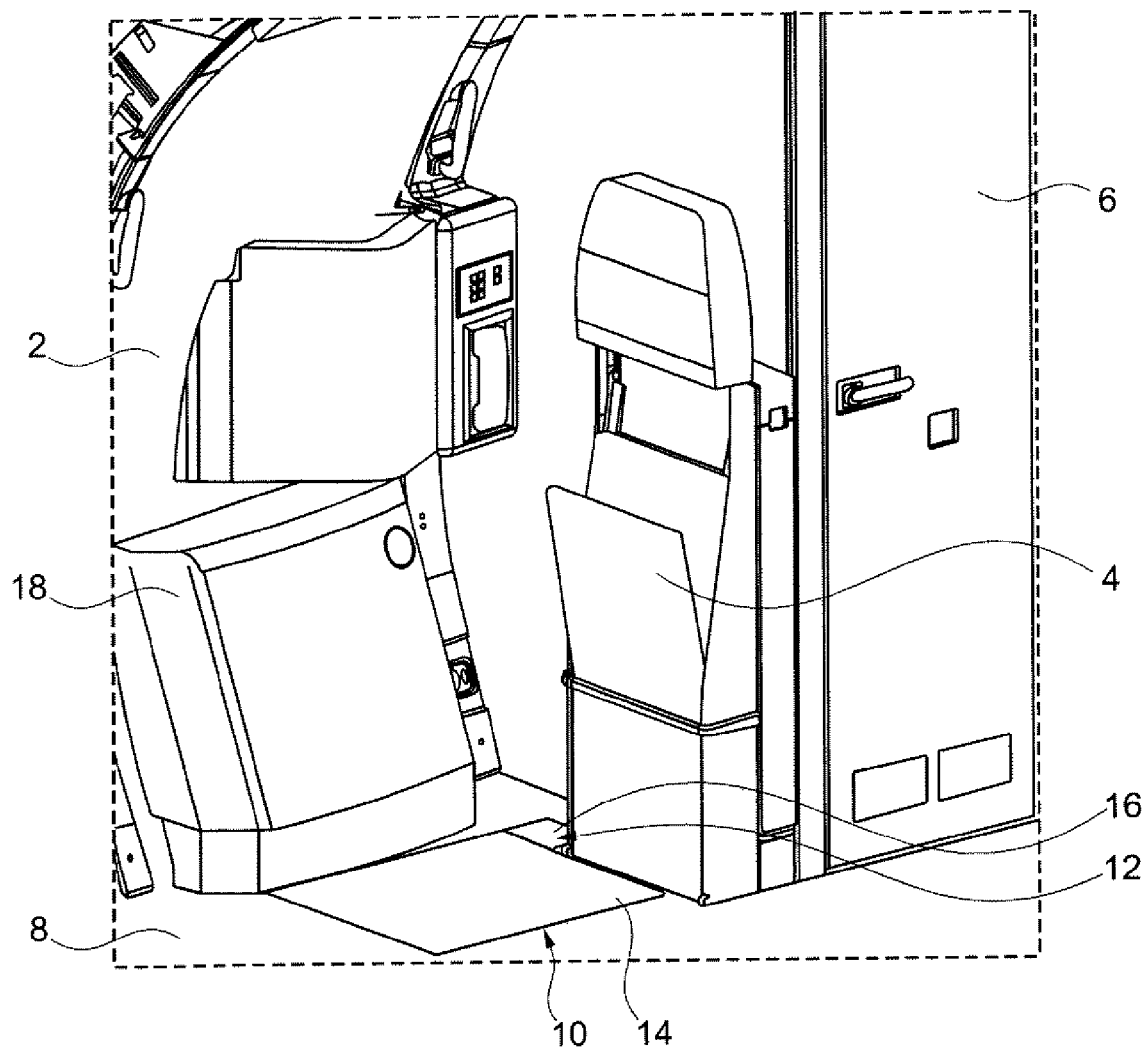
FIG. 1: a three-dimensional view of the installation space of the assembly according to the invention.

FIG. 1 shows the general design of an emergency exit region in a passenger cabin, in which emergency exit region the assembly according to the invention is positioned. For example, near the rear end of the aircraft fuselage, in the region shown in the figure, an emergency exit door 2, a folding seat 4 for a member of the aircrew, and a toilet 6 are arranged. A first stowage compartment 10 and a second stowage compartment 12 are embedded in the cabin floor 8 and are closed off in each case by a flap 14 or 16. The emergency exit door 2, which is situated in close proximity, comprises a stowage compartment 18 for stowing a slide raft that extends in the direction of the assembly according to the invention.

Figure 2:
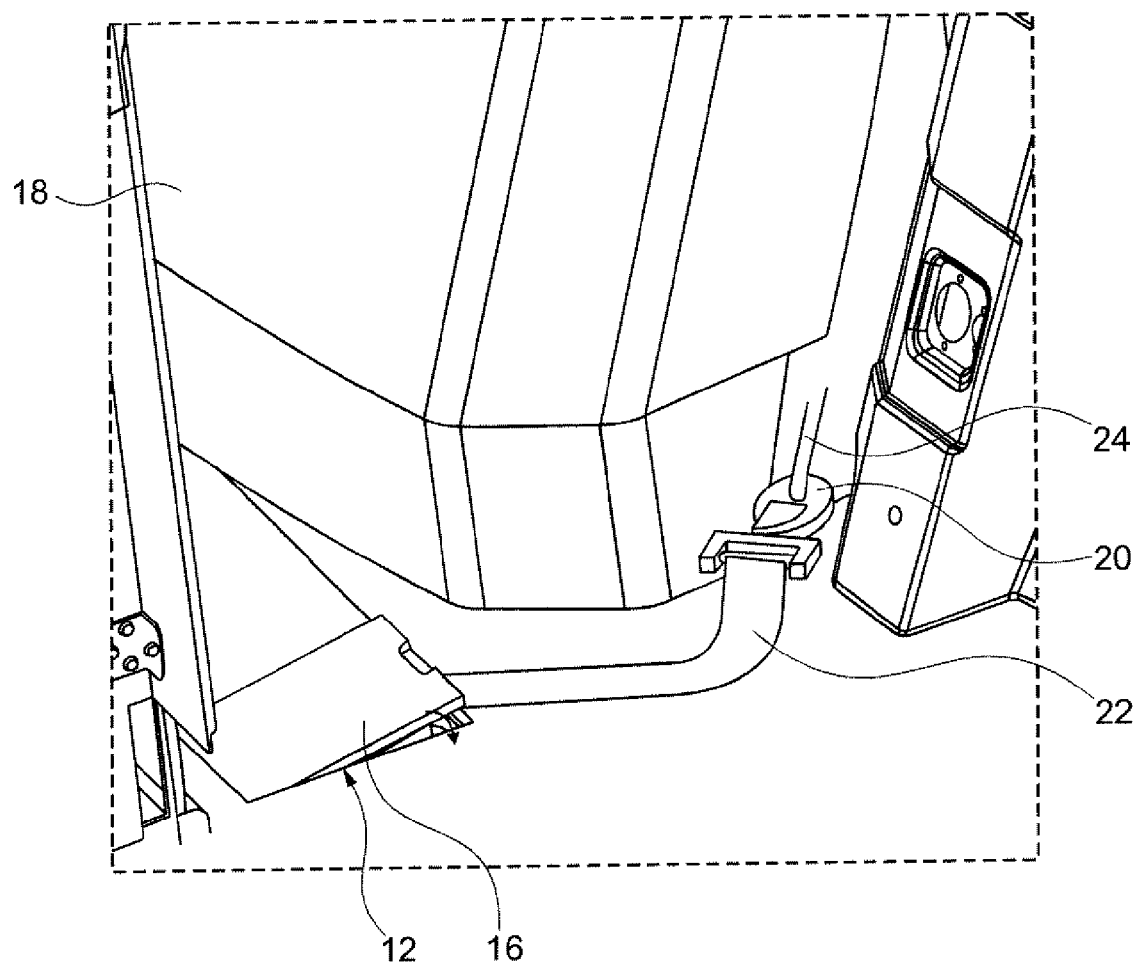
FIG. 2: a three-dimensional view of the installation space comprising a hook that has been removed from the second stowage compartment and has been affixed to the slide raft.

As shown in FIG. 2, positioning the assembly according to the invention in close proximity to the stowage compartment 18 for stowing the slide raft is very advantageous. From the second stowage compartment 12, hereinafter also referred to as the "auxiliary stowage compartment", a hook 20 may be removed, which by means of a strap 22 is connected to the survival kit (not shown in FIG. 2) that is accommodated in the first stowage compartment 10. In preparation for the evacuation, the removed hook 20 is connected, by way of a link 24, to the slide raft that is kept in the stowage compartment 18. This is carried out, in particular, in the smooth flight phase prior to an emergency landing on water so that the preparation for the removal of the survival kit has already been made prior to evacuation, without there being any danger of obstructing the passengers to be evacuated. It is most favourable if the hook 20 comprises a snap-in device, which after latching the hook 20 to the link 24 secures the hook 20 in that location. In the simplest case the hook 20 is implemented as a carbine swivel. The strap that extends from the auxiliary stowage compartment 12 to the link 24 preferably lies flat against the floor and closely conforms to adjoining partition walls. While the hook 20 is connected to the link 24, the survival kit always remains untouched in its stowage compartment 10, and the closure flap 14 of said stowage compartment 10 remains closed. After the hook 20 has latched onto the link 24 the closure flap 16 of the auxiliary compartment 12 may be closed again so that any danger of tripping over is eliminated. The closure flap 16 and/or the adjacent floor region are/is adapted such that with the closure flap 16 in its closed state the strap 22 is not jammed.

Figure 3:
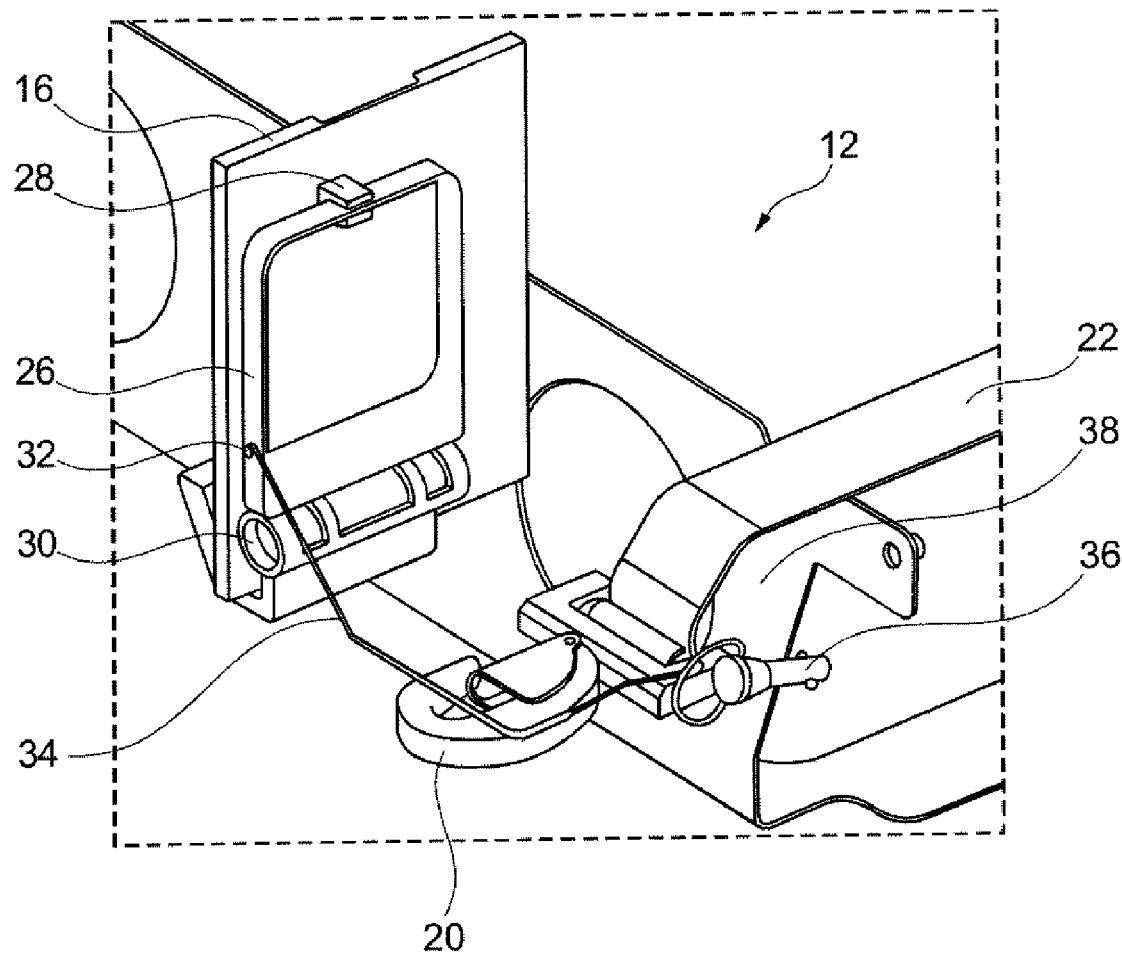
FIG. 3: a three-dimensional detailed view of the second stowage compartment of the assembly according to the invention.

The illustration in FIG. 3 further clarifies the basic design. The diagram shows an auxiliary compartment 12 whose closure flap 16 is open and is in a position so that from the cabin floor 8 it is inclined upwards by an angle of approximately 90°. On the inside of the closure flap 16 there is a lever 26 that is connected to the closure flap 16 by means of a clip-like connecting element 28. When the closure flap 16 is opened, the lever therefore also hinges upwards on its rotary axis 30. On the lever 26 there is a tie-down point 32, for example a pin, a hook, a bolt or the like, which tie-down point 32 is arranged so as to be spaced apart from the rotary axis 30 of the lever 26. Attached to the tie-down point 32 is a linear-shaped attachment means 34, for example a wire 34, whose other end is connected to a securing means in the shape of a cotter pin 36. The cotter pin 36 is used to lock down the closure flap 14 of the first stowage compartment 10 relative to a floor structure 38. This is used for securing the closure flap 14 in view of the load alternations and normal vibrations that occur in the aircraft. In order to simplify removal of the survival kit from the stowage compartment 10, automatic unlocking of the closure flap 14 of the stowage compartment is desirable. This is implemented in that the lever 26 that hinges open, by way of the tie-down point 32, pulls the wire 34 in the direction of the rotary axis 30, as a result of which the wire 34, which in the illustration of FIG. 3 is deflected by approximately 90°, removes the cotter pin 36 from a corresponding opening (not shown in detail) of the closure flap 14. The unlocked closure flap 14 continues to remain closed after the auxiliary compartment 12 has been opened and after unlocking as a result of the intrinsic weight of said closure flap 14.

If during an emergency landing, either on land or on water, the first step of opening the auxiliary compartment 12 is carried out in order to attach the hook 20 to the link 24 of the slide raft, the wire 34 automatically unlocks the closure flap 14 of the first stowage compartment for the survival kit so that as a result of the strap 22 being pulled the survival kit may be removed from the first stowage compartment 10 from the slide raft.

Figure 4:
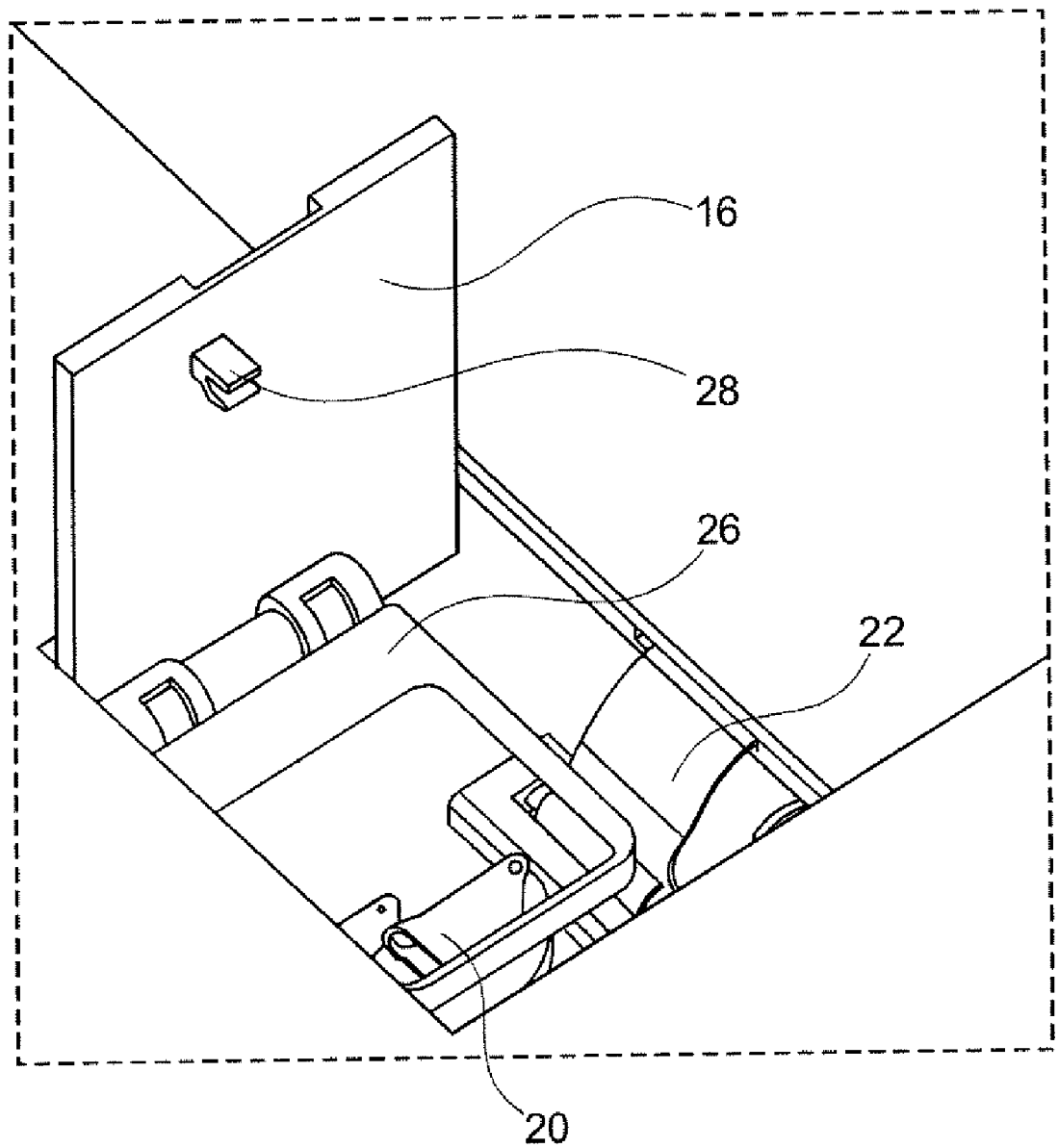
FIG. 4: a further three-dimensional detailed view of the second stowage compartment during maintenance.

If during aircraft maintenance the survival kit is checked or replaced, the stowage compartment 10 needs to be closed again and secured by means of the cotter pin 36. To this effect the lever 26 may be removed from the clip-like closure element 28 of the closure flap 16 and may be placed so as to be separate from the closure flap 16, as shown in FIG. 4. After this the wire 34 is no longer tensioned, so that the cotter pin 36 may manually be inserted into the closure flap 14 for securing it. After this the closure flap 16 of the auxiliary compartment 12 may be closed, as a result of which the lever is pushed into the clip-like closure element 28, clicks-in in that location, and implements automatic detachment of the cotter pin 36 the next time the auxiliary compartment 12 is opened.

Figure 5:
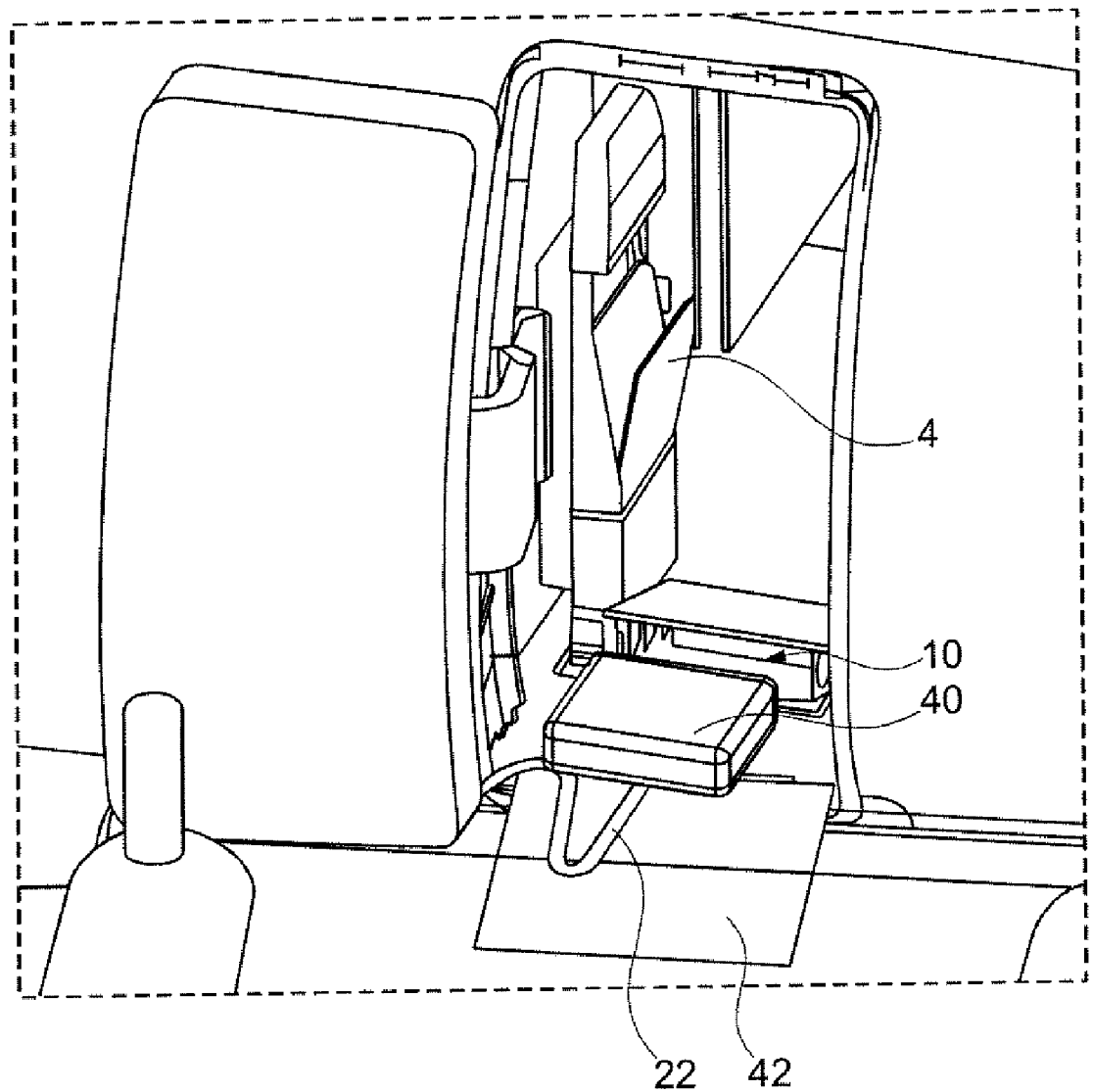
FIG. 5: a three-dimensional view of the assembly according to the invention during the transfer of the survival kit to the slide raft.

Finally, FIG. 5 shows the removal of the survival kit 40 from the slide raft 42. After evacuation of the passengers through the emergency exit into the slide raft 42, by way of the strap 22 the survival kit 40 is pulled from the stowage compartment 10, which opens up as a result of pulling the survival kit 40, and is placed into the floating slide raft 42. Accordingly, during evacuation into the slide raft 42 none of the passengers is impeded from exiting through the exit door 2; passengers do not trip over an already prepared survival kit 40; and after evacuation of the passengers there is no need for a member of the cabin crew to return to the aircraft in order to look for the survival kit 40 and to take it along.

Figure 6A:
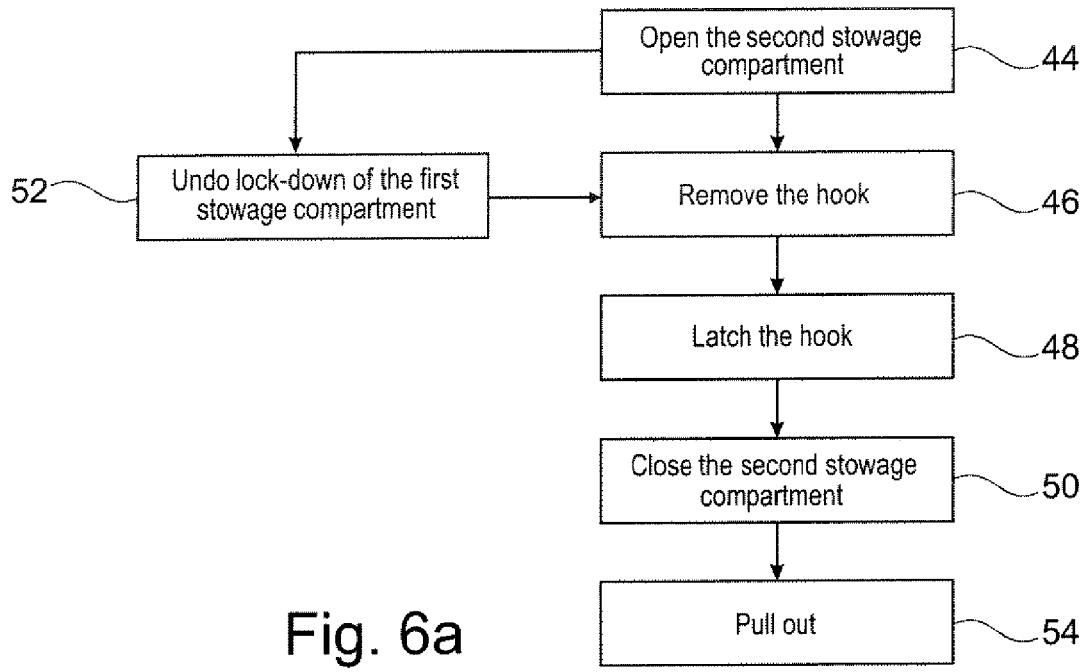
FIG. 6a: a diagrammatic view of the method according to the invention for removing the survival kit.
Figure 6B:
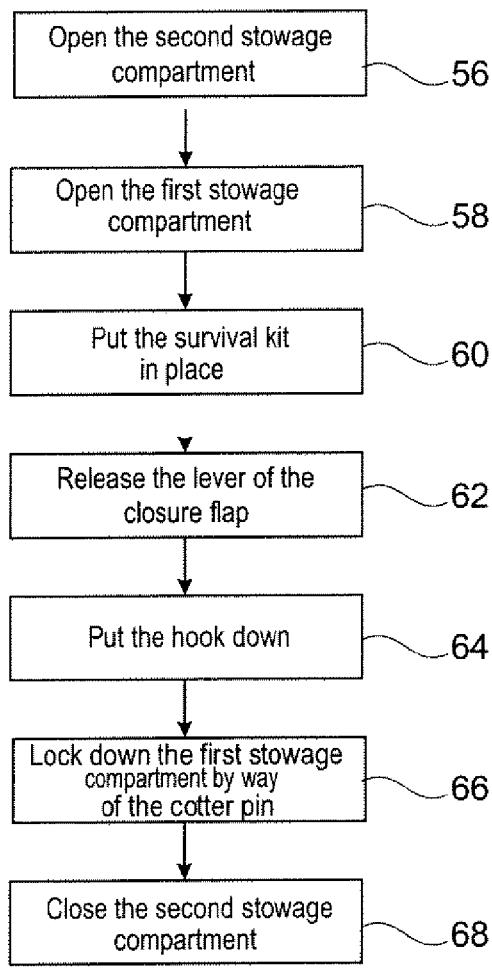
FIG. 6b: a diagrammatic view of the method according to the invention for stowing away the survival kit.

Lastly, FIG. 6a shows the method according to the invention for removing, and in FIG. 6b for stowing away, the survival kit 40. This is briefly summed up below. The method according to the invention for removing the survival kit 40 essentially comprises the steps of: opening 44 the closure flap 16 of the auxiliary stowage compartment 12; removing 46 the hook 20 that is connected to the survival kit 40 by way of a strap 22; latching 48 the hook 20 to a suitable attachment means 24 of a rescue device 42; and closing 50 the closure flap 16 of the second stowage compartment 12, wherein during opening of the closure flap 16 of the second stowage compartment 12 at the same time by hingeing back the lever 26 that is disconnectably connected to the closure flap 16, the securing means 36 is detached 52. Finally, the survival kit 40 may be removed from the first stowage compartment 10 by pulling said survival kit 40 out 54 by the strap 22.

The method for stowing away the survival kit essentially comprises the steps of: opening 56 the closure flap 16 of the second stowage compartment 12; opening 58 the closure flap 14 of the first stowage compartment 10; putting in place 60 the survival kit 40; subsequently detaching 62 the lever 26 that is disconnectably connected to the closure flap 16 of the second stowage compartment 12; hingeing back 64 the lever 26 into the second stowage compartment 12; subsequently closing the closure flap 14 of the first stowage compartment 10; locking down 66 the closure flap 14 of the first stowage compartment 10; and closing 68 the closure flap 16 of the second stowage compartment 12.

The arrangement according to the invention for stowing away a survival kit, and the method according to the invention, thus provide a new and optimal concept for stowing away a survival kit, which concept does not use up valuable space for cabin baggage and which, during evacuation, results in reduced obstruction of passengers when they leave the aircraft.

All the mechanical elements shown are to be interpreted as exemplary embodiments. The illustrations in the figures do not limit the scope of the application, which scope is solely defined by the claims. Instead, lock-down means other than a cotter pin or the like are imaginable, and other forms of hooks and/or straps are possible. The illustrations provided have been selected and presented only to explain the invention.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments may also be used in combination with other characteristics or steps of other exemplary embodiments described above. Reference characters in the claims are not to be interpreted as limitations.

The invention claimed is:

1. An assembly for stowing away and removing a survival kit in a passenger cabin of an aircraft, comprising:
   a first stowage compartment put in place in a floor of the passenger cabin;
   a survival kit;
   a strap connected at a first end thereof to said survival kit; and
   a hook connected to a second end of said strap,
   wherein the first stowage compartment is configured to accommodate the survival kit and is adapted for leading out the strap, and
   wherein said hook is configured for attaching the survival kit to an attachment device of a rescue device, with the first stowage compartment remaining closed.

2. The assembly of claim 1, further comprising a second stowage compartment adjacent to the first stowage compartment and configured to be put in place in the floor, wherein the second stowage compartment is configured to accommodate the hook.

3. The assembly of claim 1, wherein the first stowage compartment and the second stowage compartment comprise a first closure flap and a second closure flap, respectively.

4. The assembly of claim 3, wherein at least one of the first and second closure flaps can be closed so as to be flush with the floor surface.

5. The assembly of claim 3, wherein the first stowage compartment comprises a hingeable lever which is held so as to be hingeable on a rotary axis that is shared with the first closure flap of the first stowage compartment.

6. The assembly of claim 5, wherein the lever comprises a tie-down element spaced apart from the rotary axis, with one end of a linear-shaped attachment device being attachable to the tie-down element, and with the other end of the tie-down element being connectable to a securing device that is configured to releasably lock down the second closure flap of the second stowage compartment with a structural component of the floor.

7. The assembly of claim 6, wherein the linear-shaped attachment device is configured, when the lever is completely within the first stowage compartment, to position the securing device in a lock-down position.

8. The assembly of claim 6, wherein the linear-shaped attachment device is configured as a wire, a cord, or a chain.

9. The assembly of claim 5, wherein the first closure flap comprises a clip-like connecting element for removably connecting the lever to the first closure flap of the first stowage compartment.

10. The assembly of claim 1, further comprising a rescue device, wherein the rescue device comprises a life-boat, a slide or a raft.

11. An aircraft comprising:
    a rescue device comprising an attachment device; and
    an assembly for stowing away and removing a survival kit in a passenger cabin of the aircraft, comprising:
      a first stowage compartment put in place in a floor of the passenger cabin;
      a survival kit;
      a strap connected at a first end thereof to said survival kit; and
      a hook connected to a second end of said strap,
      wherein the first stowage compartment is configured to accommodate the survival kit and is adapted for leading out the strap, and
      wherein said hook is configured for attaching the survival kit to the attachment device of the rescue device, with the first stowage compartment remaining closed.

* * * * *